Aug. 18, 1970 H. SCHONEMEYER ET AL 3,524,943

CONTROL FOR CENTRALLY CONTROLLED SWITCHING GRIDS IN TELECOMMUNICATION EXCHANGE SYSTEMS

Filed Sept. 20, 1966 2 Sheets-Sheet 1

United States Patent Office 3,524,943
Patented Aug. 18, 1970

3,524,943

CONTROL FOR CENTRALLY CONTROLLED SWITCHING GRIDS IN TELECOMMUNICATION EXCHANGE SYSTEMS

Hilmar Schonemeyer, Ditzingen, Walter Hackenberg, Hirschlanden, and Herbert Siegel, Munchingen, Germany, assignors to International Standard Electric Corporation, New York, N.Y., a corporation of Delaware Filed Sept. 20, 1966, Ser. No. 580,690
Claims priority, application Germany, Sept. 30, 1965, St 24,447
Int. Cl. H04q 3/48
U.S. Cl. 179—18 2 Claims

ABSTRACT OF THE DISCLOSURE

Switching control in a telephone system for originating and terminating internal traffic as well as for terminating external traffic is provided by a common directional switching grid.

The invention relates to control devices for centrally controlled switching grids in telephone exchange systems, and more particularly to arrangements including groupings of the control equipment in such telephone exchanges.

The arrangements presently used in some telephone exchanges include the groupings of control equipment into three separate groups. The first group of control equipment controls the local calls. The second group of control equipment includes the equipment for controlling the incoming trunk calls and the third group of control equipment includes the control equipment for controlling the outgoing trunk calls. This particular grouping of equipment has certain physical advantages, however, it has proven to be inefficient in the use of equipment. More particularly each of the groups require what turns out to be redundant control equipment.

Accordingly, an object of this invention is to modify the groupings by using certain of the control equipment in common that is normally provided in the first and the second above described groups of control equipment.

The control equipment in these separate groups includes registers, translators and markers as well as access or directional matrices. The directional matrices are the matrices used to selectively connect from the connectors or junction sets to certain of the control equipment or to distributors. For example, there are access or directional matrices used to obtain access to a common group of registers. Similarly, there are access or directional matrices used to select paths from junctor to common distributing equipment. One characteristic of these access matrices is that they are directional, that is they extend only from the control equipment to the common equipment. The directional matrices referred to further herein as directional matrices include those which go from the connectors that terminate the switching matrices going to line circuits and selectively connect those connectors to distributors. The directional matrices are necessary, for example, to connect the individual calling subscriber to the proper trunk line to thus connect the calling subscriber to an exchange which is identified during the calling dialing procedure.

These control groups form compact functional groups which can operate nearly independently. Such a strict separation of the control groups requires a considerable expenditure in control devices.

The above mentioned and other objects of this invention together with the manner of obtaining them will become more apparent, and the invention itself will be best understood by making reference to the following description of an exemplary embodiment of the invention taken in conjunction with the acocmpanying drawings wherein:

FIG. 1 shows a control group for originating and terminating internal traffic, the so-called A-group.

Figures 1, 2, 3:
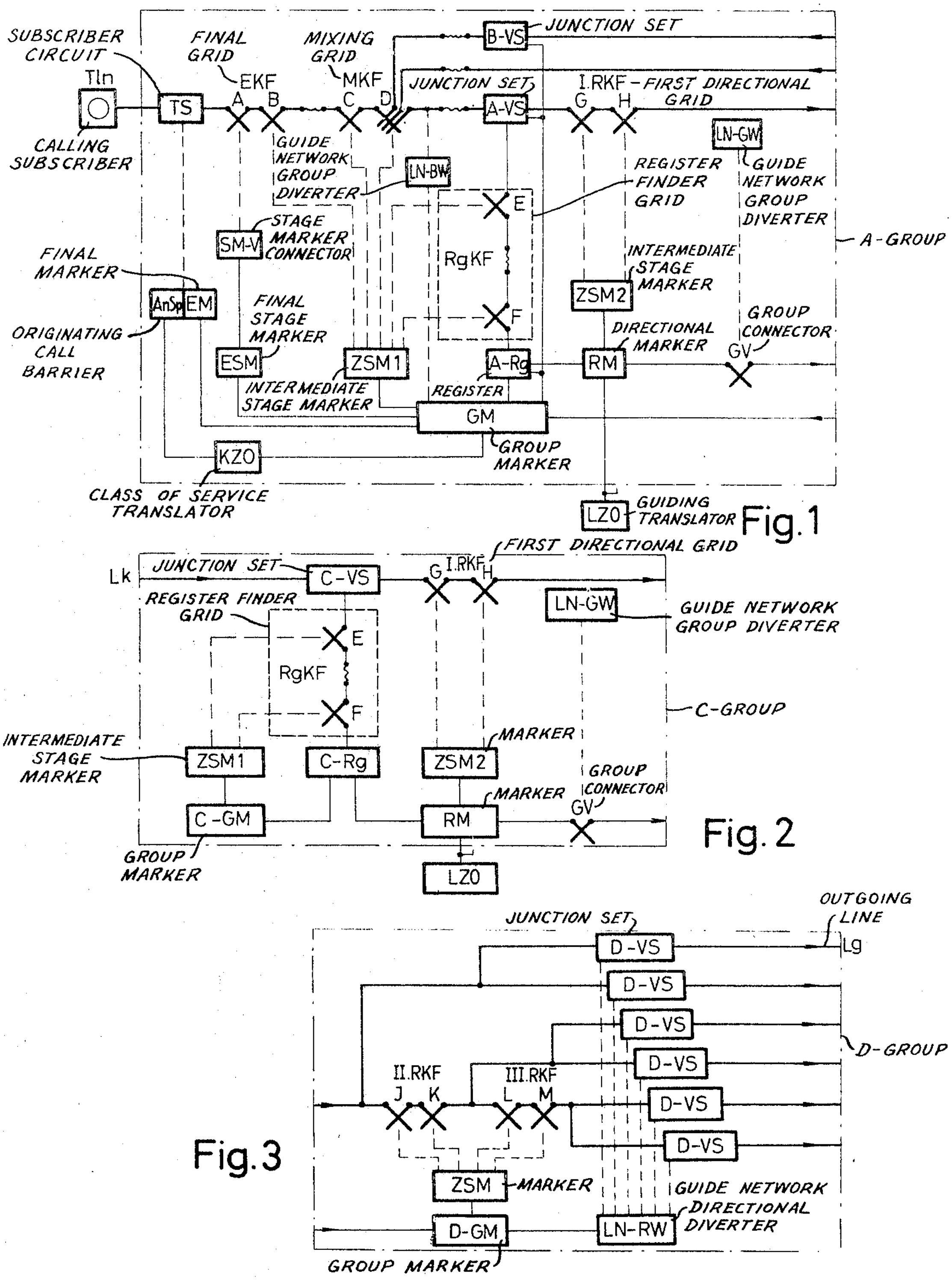
FIGS. 1–3 show in block diagram form the three groupings of control equipment of a telephone exchange.

A connection is established within the switching grid from the terminal point of the calling subscriber T*ln*, that is from the subscriber circuit accommodated in the switching multiple of the A-stage via a final switching grid EKF and a mixing grid MKF to a junction set A–VS, power supplying this section of the connection. From the junction set A–VS the connection leads on via a first directional grid I. RKF to an intermediate distributor, common to all control groups of the exchange. There the connecting paths are made through jumpering, on one hand leading to the junction sets B–VS for the called subscribers of the own A-group and probable further A-groups of the exchange, and on the other hand to the control groups for outgoing external traffic, the so-called D-groups. From there the connection routes lead to other exchanges and to the toll traffic level. It should be mentioned that outgoing trunk groups with a high traffic load are branched off directly at the first directional grid I. RKF of the A-groups, while trunk groups of a lower traffic load are connected to the second or even a third directional grid. Within the A-group the traffic aiming to a called subscriber is led from the junction set B–VS back to the switching stage D in the mixing grid MKF. The mixing grid MKF as well as the final grid EKF are used for both traffic directions, outgoing and terminating. The junction set A–VS has access to the registers A–R*g* via a register finder grid R*g*KF with the stages E and F.

A directional marker RM having a plurality of tasks is provided in the marking network. It secures that never two or more registers A–R*g* carry out the marking process. It receives the call number from the register, interrogates from a guide wire translator LZO, common to all control groups of the exchange, further setting information items and finally through-connects the marking network to other control groups via a group connector GV. A group marker GM controls the connections from the calling subscribers to the registers A–R*g* and the terminating traffic to the subscribers of the own control group. Intermediate stage markers ZSM1 and ZSM2 and a final stage marker ESM with a stage marker connector SM–V, carry out the route search in the switching network and the through-connection of the call. Each final grid EKF with a defined number of subscriber lines disposes over a final marker EM, which secures the access to the subscriber circuits TS for testing and marking purposes. The originating call barrier A*n*S*p* associated to the same group of subscriber lines prevents, during a terminating call, that new requests on establishing a connection from the subscribers T*ln* of the controlled group becomes effective. In a class-of-service translator KZO the possibilities of jumpering for special information, individual to the subscribers, are stored the consideration of which substantially increases the flexibility of the control during the marking processes. Finally a guide network-group diverter LN–BW and a guide network-supergroup diverter LN–GW serves special tasks during the route search in the guide network of the crosspoint arrangement.

FIG. 2 shows in a block diagram a control group for the terminating external traffic, the so-called C-group, comprising a defined number of lines L*k*, terminating from other exchanges or arriving from the toll traffic level. Each terminating line L*k* ends in a junction set C–VS. From there the connection is advanced via a first directional grid with the switching stages G and H to the common intermediate distributor of all control groups.

There, by jumpering as in the A-groups, the outputs of the switching multiple H in the first directional grid I. RKF are led to the junction sets B–VS of the A-groups. If the exchange has to handle also through traffic, e.g. to subsidiary exchanges, connections to the control groups for outgoing external traffic, the so-called D-groups are required. Through a register finder grid R*g*KF the junction sets C–VS have access to the registers C–R*g*. An intermediate stage marker ZSM1 serves the route search in the register finder grid RgKF, whereby a group marker C–GM supervises the proper functional run-down and secures that never two or more marking processes are carried out at the same time. The route search in the first directional grid I. RKF is made by an intermediate stage marker ZSM2. The directional marker RM with the group connectors GV and the guide network supergroup diverter LN–GW have the same tasks in the C-groups as the corresponding facilities of the A-groups.

FIG. 3 shows the control group for outgoing external traffic, the so-called D-group in a block diagram. As already mentioned, outgoing trunk groups with a high traffic load are directly branched off of the switching stages H of the first directional grid I. RKF of an A-group, while the line groups with a low traffic rate can be reached only through a second or first directional grid II. RKF or III. RKF respectively. Each outgoing line L*g* leads across a junction set D–VS which on one hand permits the access of the marking devices to the individual lines and, on the other hand, serves the adaptation to the conditions of the outgoing lines L*g*. An intermediate stage marker ZSM carries out the route search in the switching stages J, K, L and M of the second and third directional grids II. RKKF and III. RKF, while a guide network directional diverter LN–RW receives the information on the group to be operated and designates the junction sets D–VS of all line of this group. A group marker D–GM finally secures that only one A- or C-group carries out a marking process simultaneously to said D-group. Moreover, said group marker D–GM supervises the functional run-down.

As the foregoing explanations show, such a subdivision of an exchange into the different control groups, means a considerable expenditure in control facilities. Each control group possesses its own central control devices which can handle a higher traffic, the higher their function speed of function is.

With such an unflexible grouping of an exchange the capability of the quickly operating electronic control devices is not fully used, if in smaller exchanges the control groups fall short a defined size.

It is the object of the invention to modify the subdivision into control groups in telecommunication and, particularly in telephone exchanges in such a way that the centrally arranged control devices and the switching grids are used more effectively. The control device for centrally controlled switching grids in telecommunication and, particularly telephone exchanges, being is subdivided into different control groups for originating and terminating internal traffic, for terminating external traffic and for outgoing exteranl traffic. It is characterised, according to the invention, in this that to each control group for outgoing and terminating internal traffic and to each control group for terminating external traffic a common directional grid is associated, having a common directional marker. This combination of an A-group with a C-group with regard to the control, results in a more effectively used directional grid and in savings of markers.

According to the construction of the new control device connections can be established via the common directional grid from the junction set of the calling subscriber traffic as well as from the junction set of a terminating to the junction set of the called subscriber in the control group for outgoing and terminating internal traffic, or, via another directional grid, to a junction set of an outgoing line in the control group for outgoing external line in the control group for terminating external traffic to a junction set of the called subscriber in the control group for terminating and originating internal traffic, or, via another directional grid, to a junction set of an outgoing line in the control group for outgoing external traffic. The junction set of an outgoing line can be actuated also directly via the common directional grid.

The expenditure in control devices and crosspoint elements can be further reduced at a combination of an A-group and of a C-group in that the register finder grid of the control group for originating and terminating interal traffic and the register finder grid of the control group for terminating external traffic are combined, and that the functions of the registers of both control groups are taken over by common registers of both combined control groups. The common register finder grid is thereby controlled by the common group marker which takes over the functions of the group markers of the control group with originating and terminating internal traffic and of the control group with terminating external traffic.

Figure 4:
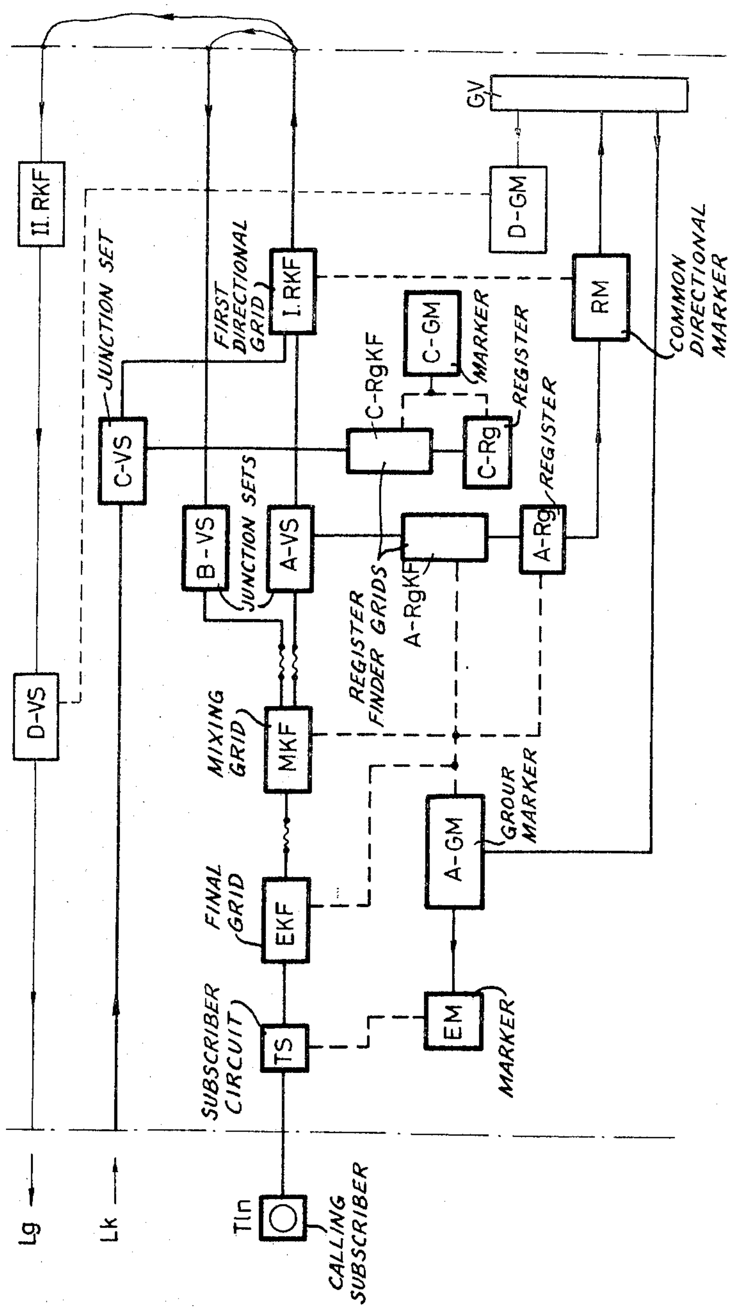
FIG. 4 shows in block diagram form an improvement in the arrangement shown in FIGS. 1–3 for a telephone exchange.

The invention is now in detail explained with the aid of a block diagram shown in FIG. 4, which displays the combination of an A-group with a C-group according to the invention with regard to the control.

The devices in FIG. 4 drawn in thick lines clearly designate this combination of the central control devices of an A- and a C-group.

In this connection only the deviations compared to an unflexible grouping according to FIGS. 1 and 2 are emphasized.

The first directional grid RKF is now actuated by the junction set A–VS of the calling subscriber of the control group for originating and terminating internal traffic and by the junction set C–VS of the control group for terminating external traffic. A common directional marker RM controls the establishment of a connection via the first directional grid I. RKF.

In FIG. 4 a register A–R*g* can be connected to the junction set A–VS via a register finder grid A–R*g*KF, which register is requested when establishing a connection in the internal group A while a register C–R*g* is connectable through a register finder grid C–R*g*KF to the junction set C–VS, which register is requested when establishing a connection in the external group C. As both control groups are combined in a common first directional grid I. RKF with a common directional marker RM, a common register finder grid may also be provided, according to the invention, through which the junction sets A–VS as well as the junction sets C–VS have access to common registers. These common registers carry out the functions required for both control groups. Said common register finder grid is controlled by a group marker, carrying out the functions of the group markers A–GM and C–GM.

The traffic flowing over the control group for outgoing external traffic is not influenced by the combination of an A-group and of a C-group with regard to control.

The external connections outgoing from the A-group as well as the through-connections terminating from the C-group and leading to the D-group can be led over the output of the first directional grid I. RKF.

If one compares the expenditure in control devices of these combined control twin group with the expenditure of both separate control groups according to FIGS. 1 and 2, the savings can clearly be seen, particularly in the switching network and on markers.

At the high operating speed of electronic control devices this combination can be carried out without difficulties, because all control processes of a twin group are performed without perceivable delays.

What is claimed is:

1. An arrangement of control devices in a telephone exchange wherein said control devices are divided into three different groups, a first group comprising the control devices used for local calls originating at said exchange, the second group including control equipment for controlling incoming trunk calls, and the third group comprising control equipment necessary for controlling outgoing trunk calls, the first group of control devices used for controlling equipment including subscriber line circuitry for coupling subscribers substations directly to the exchange, switching grids coupling said line circuits to first junction circuits, said switching grids comprising a final grid coupled directly to the line circuit and a mixing grid serially linked between said final grid, and said first junction circuits, said first junction circuits connected to return junction circuits, said return junction circuits also connected to said mixing grid whereby a calling subscriber substation connected directly to said exchange can make connection with a local called subscriber station also connected directly to the exchange by going through the line circuitry, the switching grids, the first junction circuit, the return junction circuit, the switching grids and the line circuitry to the called station, said control equipment including directional grid means for coupling said first junction set to the equipment controlled by said third group of control devices through a distributor, said second group of control devices used to control equipment including incoming trunk circuits used to couple incoming trunk, to said exchange, coupling means for coupling said incoming trunk circuits to said line circuitry through said return junction set, said coupling means including said directional grid means whereby said second group and said first group share the same directional grid means, said third group of control devices controlling equipment including outgoing trunk circuit for coupling said outgoing trunks to said exchange, and means for connecting the same directional grid to the outgoing trunk circuit through another directional grid unique to said outgoing trunk circuit.

2. The control arrangement of claim 1 wherein common directional marker means are provided for use by said first junction set and said second group of control devices.

No references cited.

WILLIAM C. COOPER, Primary Examiner